United States Patent [19]

Freyvogel

[11] Patent Number: 4,895,303

[45] Date of Patent: Jan. 23, 1990

[54] SPRINKLER SYSTEM FERTILIZATION REGULATOR

[76] Inventor: Frank C. Freyvogel, 2061 Waltoffer Ave., North Bellmore, N.Y. 11710

[21] Appl. No.: 219,145

[22] Filed: Jul. 15, 1988

[51] Int. Cl.$^4$ .................... A01G 25/00; B05B 12/04
[52] U.S. Cl. ........................... 239/61; 239/68; 239/69; 239/70; 239/307; 239/310
[58] Field of Search .............. 239/61, 64, 67–70, 239/303–305, 307, 310

[56] References Cited

U.S. PATENT DOCUMENTS

| | | | |
|---|---|---|---|
| 2,905,117 | 9/1959 | Dugan | 111/7 |
| 3,322,350 | 5/1967 | Heinicke | 239/304 |
| 3,491,948 | 1/1970 | Alexander | 239/304 |
| 3,770,198 | 11/1973 | Mihara | 239/310 |
| 4,171,710 | 10/1979 | Boynton | 137/889 |
| 4,209,131 | 6/1980 | Barash et al. | 239/68 |
| 4,324,294 | 4/1982 | McLoughlin | 239/61 |
| 4,768,712 | 9/1988 | Terrell | 239/68 |

Primary Examiner—Andres Kashnikow
Assistant Examiner—Karen B. Merritt
Attorney, Agent, or Firm—Michael I. Kroll

[57] ABSTRACT

A sprinkler system fertilization regulator is provided that automatically mixes a plurality of chemicals for the purpose of fertilization, weed control, or insect control. An electrically operated manifold distributes the chemical/water stream to each of the sprinkler zones provided. The output stream pressure is programmable, constant, and independent of the incoming fresh water pressure. Controls are provided for programming the relative percentage concentration of each of the constituent chemicals. Closed-loop fluid control systems are used throughout.

5 Claims, 2 Drawing Sheets (ELECTRONIC CONTROLLER)

SPRINKLER SYSTEM FERTILIZATION REGULATOR

BACKGROUND OF THE INVENTION

The present invention relates generally to the field of fluid control, and, more specifically to systems for applying chemicals such as fertilizer, weed killer, and insecticide to a lawn or garden.

At present, the application of these chemicals is a manual task. The gardener applies each in sequence as a directed activity. There are a number of problems inherent in such an undertaking. First, such an application requires that the gardener obtain a hose of sufficient length to reach all parts of the lawn or garden and that he locate a siphon pump to combine the concentrate chemical into the water stream. This effort is labor intensive and tends to expose the individual to noxious chemicals during application. Due to its difficulty, the application is likely to be delayed to the detriment of the lawn or garden. In addition, there are the short-term and long-term consequences of exposure to these chemicals to consider.

Furthermore, the application of chemicals in such an operation tends to be uneven to the extreme. Even though there may be a well-designed automatic sprinkler system in place capable of even distribution of water, the manual application of chemicals makes it difficult to achieve even coverage of the fluid stream from the hose. In addition, the gardener has almost no control over the relative concentration of the chemicals in the water stream nor the rate of flow of the stream. In short, this is a very error-prone activity. Chemicals are likely to be wasted or misapplied. Because the individual has no facility for carefully controlling the composition of the chemical mixture applied, he often purchases multiple fertilizers, for example, that contain the same chemicals but in different concentrations.

SUMMARY OF THE INVENTION

It is, therefore, a primary object of the instant invention to provide a sprinkler system fertilization regulator that allows a user to apply a chemical mixture to each of several sprinkler system zones.

Another object is to provide a sprinkler system fertilization regulator in which the relative concentration of each of the chemicals can be controlled.

A yet further object is to provide a sprinkler system fertilization regulator in which the constituent chemicals can be individually selected.

A still further object is to provide a sprinkler system ferilization regulator in which the rate of fluid flow can be set independent of the pressure of the fresh water inlet.

A yet further object is to provide a sprinkler system fertilization regulator that can be set to operate at various time of the days and to skip days if desired.

A still further object is to provide a sprinkler system fertilization regulator with a manual override so that even though in normal operation the system cycles though each zone in sequence, the operator can manually cycle through the zones to activate a particular zone.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

PARTS LIST

Figure 1:
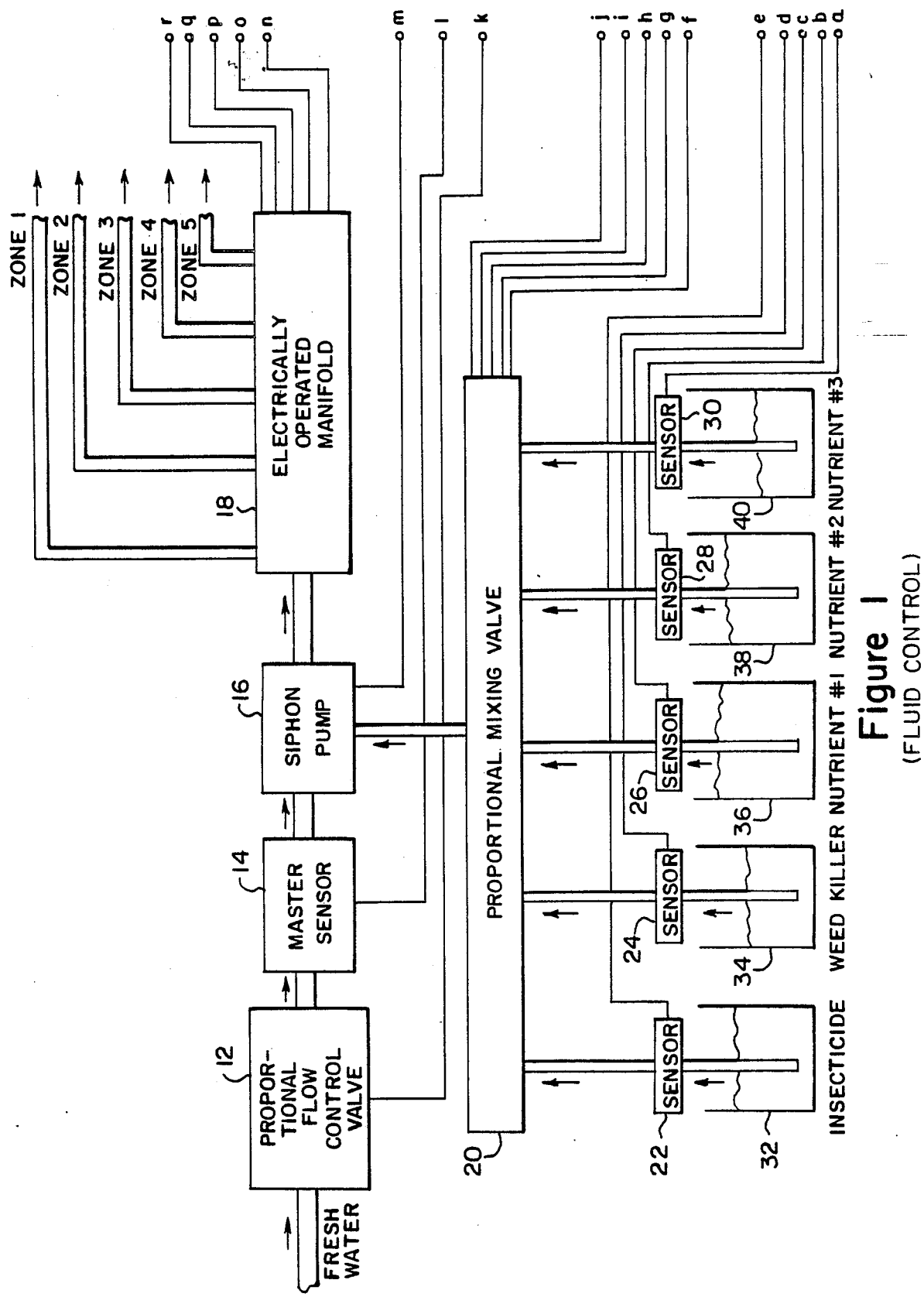
FIG. 1 is a block diagram of the fluid control portion of the invention.
Figure 2:
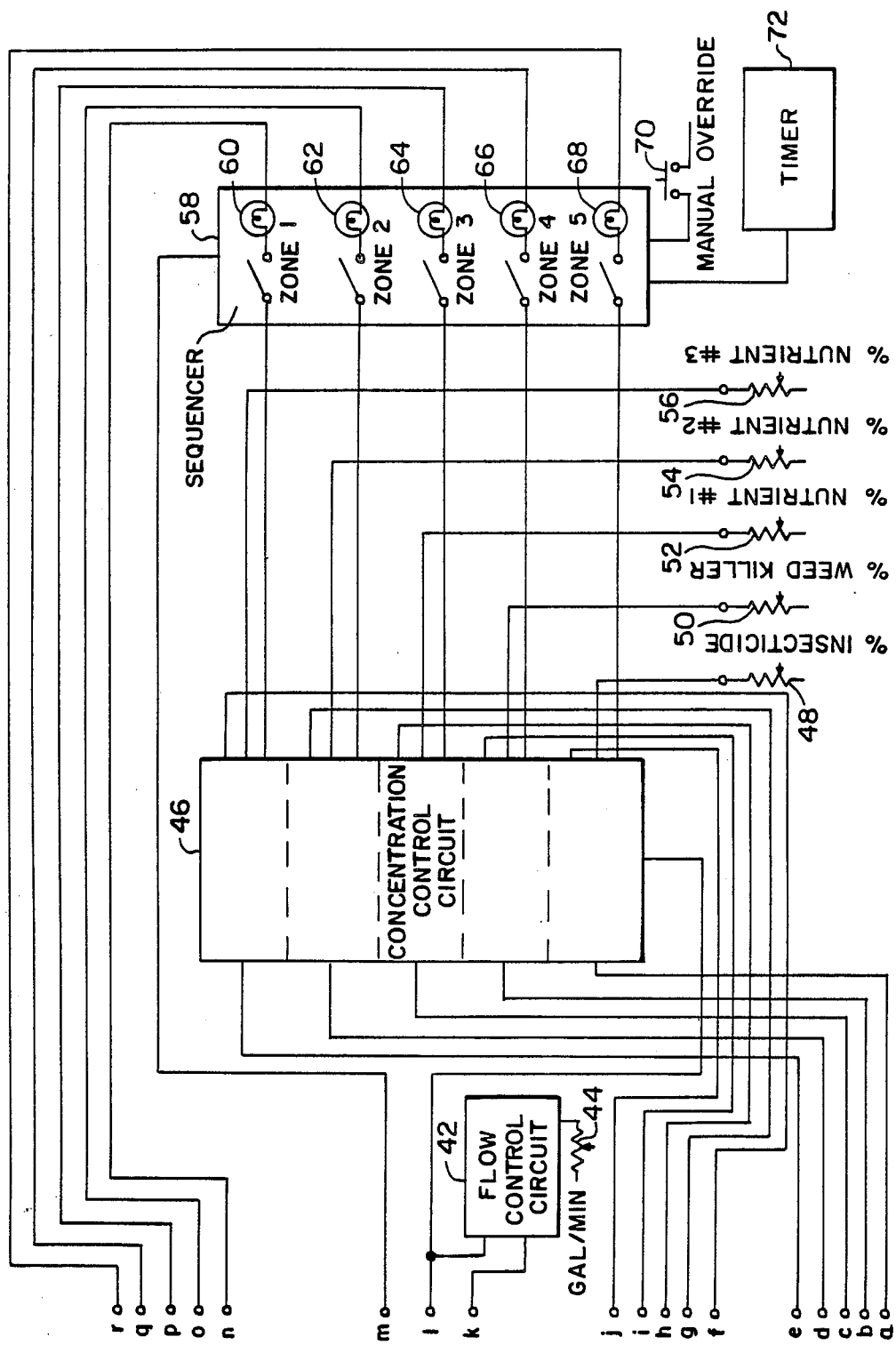
FIG. 2 is a block diagram of the electronic controller portion of the invention.

| PARTS LIST | |
|---|---|
| ITEM | DESCRIPTION |
| 12 | PROPORTIONAL FLOW CONTROL VALVE |
| 14 | MASTER SENSOR |
| 16 | SIPHON PUMP |
| 18 | ELECTRICALLY OPERATED MANIFOLD |
| 20 | PROPORTIONAL MIXING VALVE |
| 22–30 | SENSOR |
| 32 | INSECTICIDE CONTAINER |
| 34 | WEED KILLER CONTAINER |
| 36 | NUTRIENT #1 CONTAINER |
| 38 | NUTRIENT #2 CONTAINER |
| 40 | NUTRIENT #3 CONTAINER |
| 42 | FLOW CONTROL CIRCUIT |
| 44 | GALLONS/MINUTE POTENTIOMETER |
| 46 | CONCENTRATION CONTROL CIRCUIT |
| 56 | % NUTRIENT #3 POTENTIOMETER |
| 54 | % NUTRIENT #2 POTENTIOMETER |
| 52 | % NUTRIENT #1 POTENTIOMETER |
| 50 | % WEED KILLER POTENTIOMETER |
| 48 | % INSECTICIDE POTENTIOMETER |
| 58 | SEQUENCER CIRCUIT |
| 60 | ZONE 1 INDICATOR |
| 62 | ZONE 2 INDICATOR |
| 64 | ZONE 3 INDICATOR |
| 66 | ZONE 4 INDICATOR |
| 68 | ZONE 5 INDICATOR |
| 70 | MANUAL OVERRIDE SWITCH |
| 72 | TIMER |

DETAILED DESCRIPTION OF THE PREFERRED EMBODIMENTS

Fresh water is input to proportional flow control valve 12 whose output then passes through master sensor 14. The output of master sensor 14 is input to flow control circuit 42 whose output then controls proportional control valve 12. This forms a closed loop fluid circuit such that the output of proportional control valve 12 is independent of the incoming fresh water pressure and is constant in pressure as determined by the setting of gallons/minute potentiometer 44.

Chemicals to be applied to the lawn or garden are stored in containers typified by insecticide container 32, weed killer container 34, nutrient #1 container 36, nutrient #2 container 38, and nutrient #3 container 40. Each of these containers are connected to a proportional mixing valve 20 via flow sensors 22, 24, 26, 28, and 30 respectively. Siphon pump 16, which may be electrically operated or operated by water flow, lifts each fluid from its container. This siphoning takes place in a closed-loop fluid control system in which the outputs of each of the sensors 22, 24, 26, 28, and 30 are connected to concentration control circuit 46 whose output is in turn connected to proportional mixing valve 20, completing the closed loop. The relative contribution of each chemical is determined by the concentration control circuit 46 which compares the total fluid flow as determined by master sensor 14 and compares it to the individual chemical flows controlled by % nutrient #3 potentiometer 56, % nutrient #2 potentiometer 54, % nutrient #1 potentiometer 52, % weed killer potentiometer 50, and % insecticide potentiometer 48.

The actual sequencing of the Zones 1–5 is determined by sequencer 58 whose output is connected to electrically operated manifold 18. Manifold 18 takes the water/chemical mixture from siphon pump 16 and directs it to each zone as directed by the electrical signals input to it. Timer 72, connected to sequencer 58, determines the days, time of day, and duration for watering each zone. Sequencer 58 steps through the zones and as it activates each zone an appropriate zone indicator lamp, i.e. lamp 60 for Zone 1, lamp 62 for Zone 2, lamp 64 for Zone 3, lamp 66 for Zone 4, and lamp 68 for Zone 5. If the user wishes to select a particular zone out of sequence he can depress manual override switch 70 to manually step through the zones until the desired zone is activated. In addition, through connections between the concentration control circuit 46 and the sequencer 58 each zone can output a water stream with a different concentration of chemicals.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A sprinkler system for irrigating a plurality of predetermined irrigation zones 1 through 5 having a fertilization regulator, comprising:
  (a) an electrically operated proportional flow control valve that controls the flow of fresh water into said regulator wherein said flow of water is proportional to an electrical current input to said valve;
  (b) a master sensor connected to the output of said proportional flow control valve wherein the electrical output of said master sensor is proportional to the rate of flow of water through said master sensor;
  (c) a siphon pump connected to the output of said master sensor wherein said siphon pump siphons concentrated fluids and combines said concentrated fluids with said fresh water such that the output of said siphon pump is a mixture of said fresh water and said concentrated fluids;
  (d) an electrically operated manifold whose input is connected to the output of said siphon pump and whose outputs are each individually controllable by the application of an electrical current to said manifold so that said manifold outputs are attached to conventional sprinkler heads for the purpose of applying chemicals to a lawn or garden;
  (e) a proportional mixing valve connected to the siphoning input of said siphon pump;
  (f) a plurality of containers containing concentrated liquids wherein said containers are connected to each of the inputs of said proportional mixing valve such that the relative concentration of the combined concentrates is determined by electrical signals applied to said proportional mixing valve;
  (g) sensors interposed between each of said containers and said proportional mixing valve, such that the electrical output of each of said sensors is proportional to the rate of concentrates for each respective container;
  (h) means for controlling the operation of said proportional flow control valve, said electrically operated manifold, and said proportional mixing valve such that the concentration of each constituent fluid and the total amount of fluid delivered to each manifold output is independent of the fresh water inlet pressure, said means for controlling the operation of said proportional flow control valve, said electrically operated manifold, and said proportional mixing valve further comprise a timer and a sequencer, wherein said timer may be set to cause said regulator to operate at a predetermined time of the day, and said sequencer's output being connected to said electrical input of said manifold such that said sequencer causes each of the fluid outputs of said manifold to operate in a predetermined sequence, sequencing of the zones 1 through 5 is determined by said sequencer whose output is connected to said electrically operated manifold, said manifold taking the water/chemical mixture from said siphon pump and directing it to each zone as directed by the electrical signals inputed to it, said timer connecting to said sequencer determines the days, time of day, and duration for watering each zone, through connections between the concentration control circuit and the sequence, each zone can output a water stream with a different concentration of chemicals; and
  (i) indicator lamps connected to the output of said sequencer such that a visual indication is given to indicate which of said manifold's outputs is operating, said sequencer steps through the zones and as it activates each zone an appropriate zone indicator lamp lights.

2. A sprinkler system fertilization regulator, as recited in claim 1, wherein said means for controlling the operation of said proportional control valve, said electrically operated manifold, and said proportional mixing vlave comprises a flow control circuit whose input is the electrical output of said master sensor and whose output is the electrical input of said flow control valve; wherein said flow control circuit forms a closed-loop fluid control circuit such that the fluid output of said flow control valve is independent of fresh water inlet pressure and is constant and of such pressure as is determined by a potentiometer integral to said flow control circuit.

3. A sprinkler system fertilization regulator, as recited in claim 1, wherein said means for controlling the operation of said proportional control valve, said electrically operated manifold, and said proportional mixing valve further comprises a concentration control circuit whose inputs are the outputs of said sensors interposed between each of said containers and said proportional mixing valve and whose outputs are the inputs to said proportional mixing valve; wherein said concentration control circuit forms a closed-loop fluid control circuit such that the relative proportion of each concentrate output by said proportional mixing valve is independent of fresh water inlet pressure and is constant and of such pressure as is determined by a plurality of potentiometers integral to said concentration control circuit.

4. A sprinkler system fertilization regulator, as recited in claim 1, further comprising a manual override switch, which when activated manually stops said sequencer so that an operator may manually cause a desired output of said manifold to operate thereby manually watering a desired section of lawn or garden.

5. A sprinkler system fertilization regulator, as recited in claim 1, wherein said sequencer is connected to said concentration control circuit such that as each of said manifold outputs is activated said concentration control circuit can change the relative concentration of its fluid output so that each section of garden or lawn may receive different chemical treatment.

* * * * *